Nov. 17, 1925. Re. 16,212

H. POUNDER

DUMPING UNIT FOR MOTOR TRUCKS

Original Filed July 17, 1924 3 Sheets-Sheet 1

Inventor

H. Pounder.

By Lacey & Lacey, Attorneys

Nov. 17, 1925.

Re. 16,212

H. POUNDER

DUMPING UNIT FOR MOTOR TRUCKS

Original Filed July 17, 1924 3 Sheets-Sheet 2

Inventor

H. Pounder.

By Lacey & Lacey Attorneys

Nov. 17, 1925. Re. 16,212

H. POUNDER

DUMPING UNIT FOR MOTOR TRUCKS

Original Filed July 17, 1924 3 Sheets-Sheet 3

Inventor

H. Pounder.

By Lacey & Lacey, Attorneys

Reissued Nov. 17, 1925. Re. 16,212

UNITED STATES PATENT OFFICE.

HARRY POUNDER, OF GALION, OHIO, ASSIGNOR TO PERFECTION STEEL BODY COMPANY, OF GALION, OHIO.

DUMPING UNIT FOR MOTOR TRUCKS.

Original No. 1,529,374, dated March 10, 1925. Serial No. 726,531, filed July 17, 1924. Application for reissue filed April 27, 1925. Serial No. 26,310.

*To all whom it may concern:*

Be it known that I, HARRY POUNDER, a citizen of the United States, residing at Galion, in the county of Crawford and State of Ohio, have invented certain new and useful Improvements in Dumping Units for Motor Trucks, of which the following is a specification.

This invention relates to an improved dumping unit for motor trucks and seeks to provide a complete unit of this character which may be readily attached to any ordinary truck chassis to form a dumping truck.

The invention further seeks to provide a dumping unit embodying a novel dumping mechanism incorporating a rigid unitary base frame mounting the gears employed.

And the invention still further seeks to provide a mechanism embodying a combined lifting wheel and arm so incorporated that during the initial upward travel of the arm, when the load is the greatest, the body will be lifted slowly while, as the body is tilted, a progressively accelerated movement will be imparted thereto.

Other and incidental objects will appear hereinafter.

Figure 1:
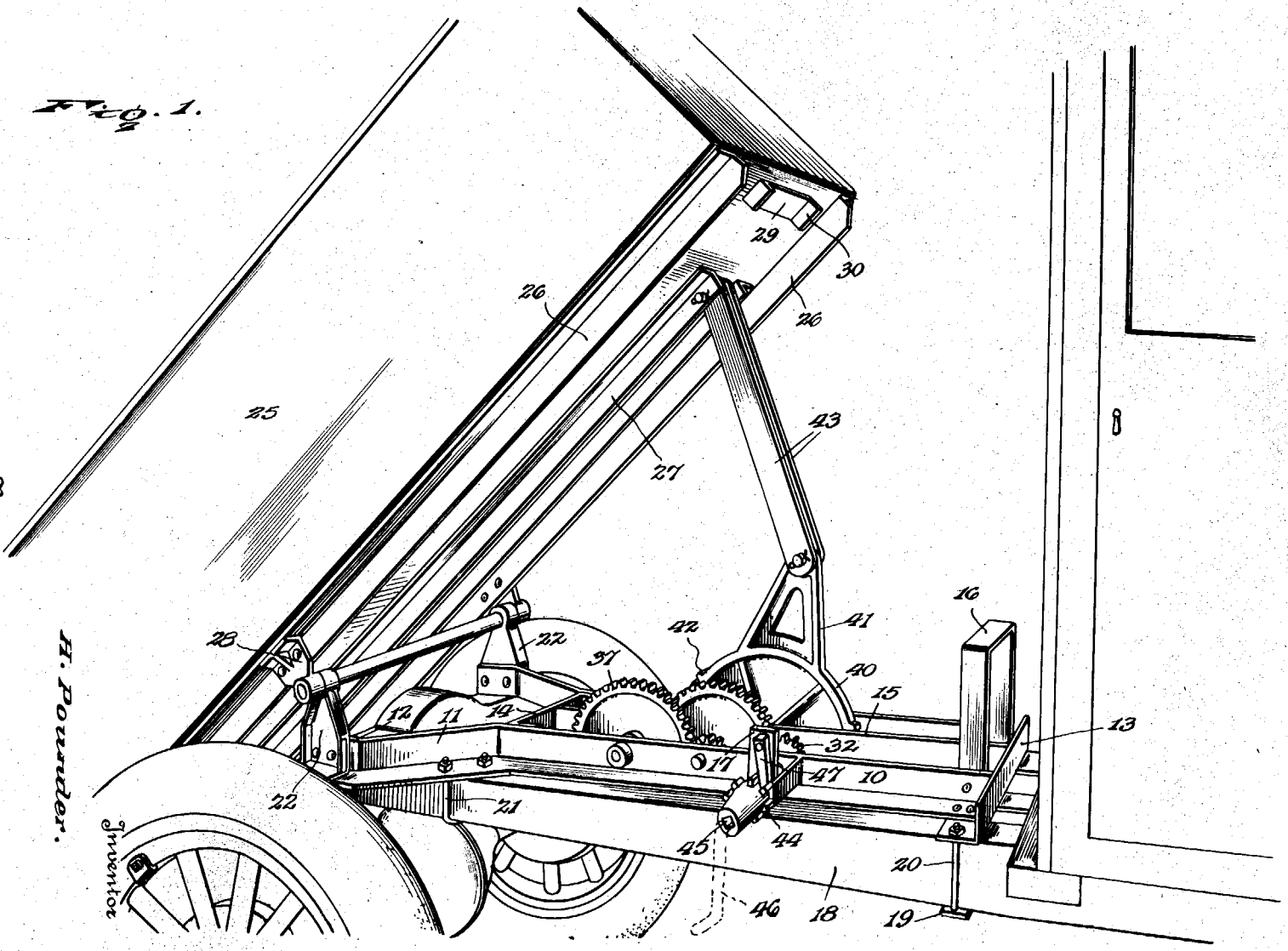
Figure 2:
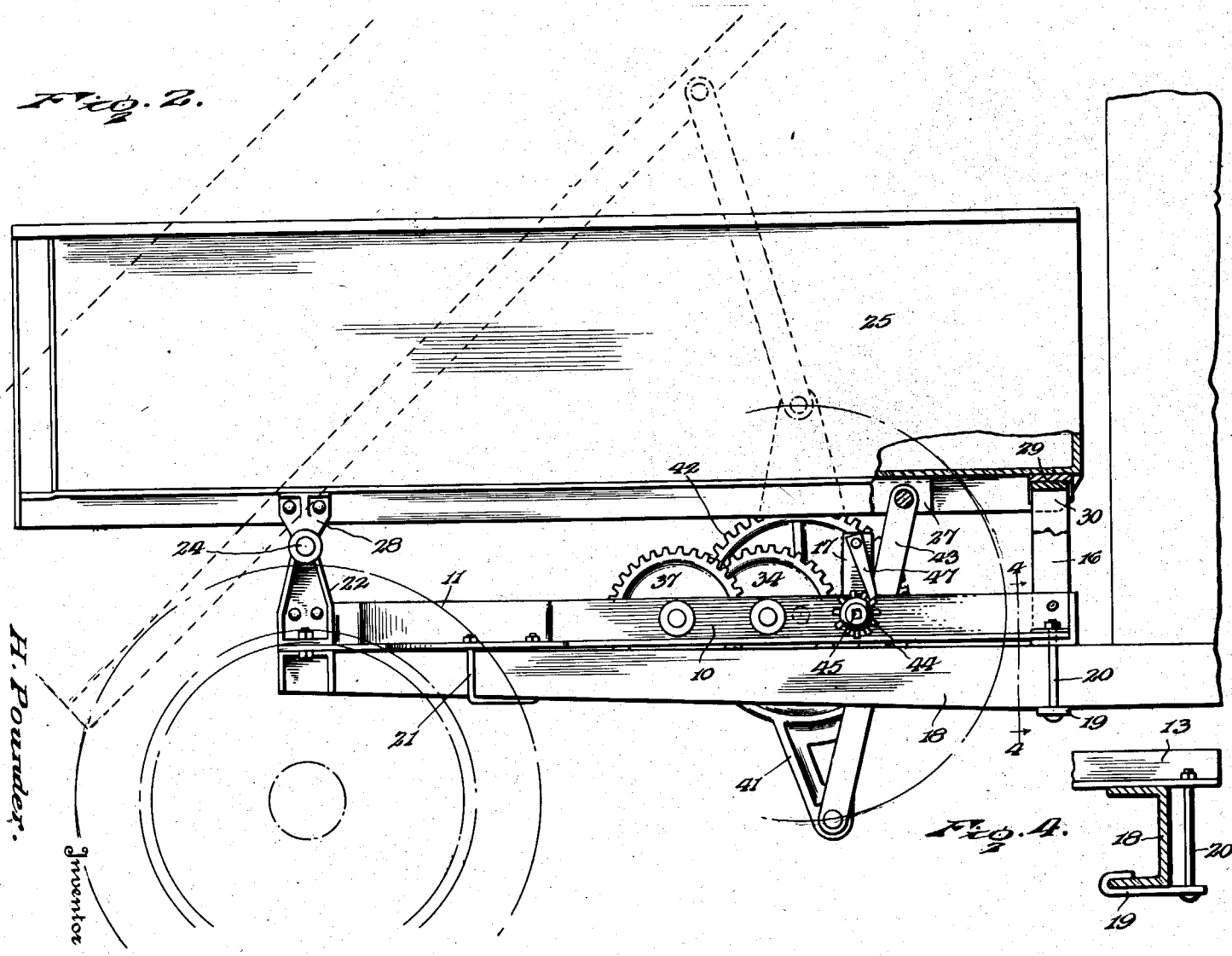
Figure 3:
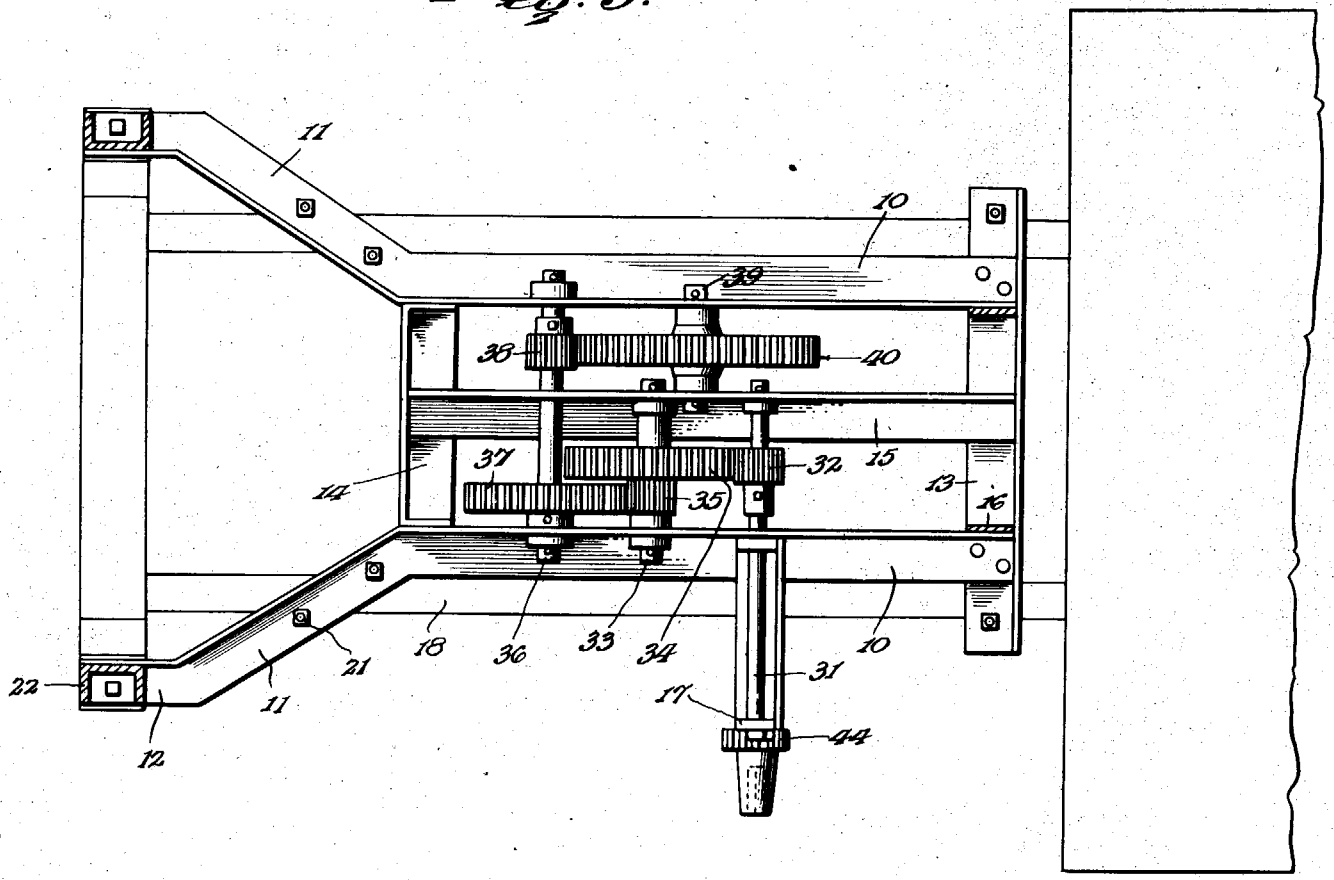

In the accompanying drawings:

Figure 1 is a perspective view showing my improved dumping unit applied to a conventional motor truck, Fig. 2 is a fragmentary side elevation, the body being shown elevated in dotted lines, Fig. 3 is a horizontal sectional view showing the base frame of the unit and the lifting gears employed, and Fig. 4 is a detail sectional view on the line 4—4 of Fig. 2, looking in the direction indicated by the arrows.

In carrying the invention into effect, I employ an oblong base frame including a pair of angle shaped side bars 10 having diverging rear end portions 11 provided with parallel terminals 12 and connecting said side bars is a front cross bar 13 at the forward ends of the side bars, and a rear cross bar 14 at the forward ends of the diverging portions 11 of said side bars. Extending between the cross bars 13 and 14 in parallel relation to the forward end portions of the side bars is a central bar 15 and rising from the forward ends of the side bars is an inverted substantially U-shaped rest 16, while to the forward end portion of the side bar at the right of the frame is fixed a laterally projecting angle bracket 17. The parts of the base frame, as thus described, are preferably welded together to produce a rigid integral structure and, if desired, the joints between the parts may be reinforced by rivets or other suitable fastening devices. In the drawings, I have shown the present unit in connection with a conventional motor truck. The side bars of the chassis frame are indicated at 18 and, as will be observed, the base frame of the unit is arranged to overlie the chassis frame longitudinally thereof, resting upon the rear end portions of the bars 18. The front cross bar 13 of the base frame of the unit is considerably longer than the rear cross bar 14 to overhang the bars 18, supporting the base frame at its forward end, and it is now to be particularly observed that the forward end portions of the bars 10 are spaced a less distance apart than the bars 18 of the chassis frame so that the diverging rear end portions 11 of the bars 10 thus cross the bars 18 for supporting the base frame near its rear end. Engaging the bottom flanges of the bars 18 are, as shown in Fig. 4, hooks 19 and extending through the ends of the bars 13 and through said hooks are bolts 20 rigidly securing the base frame at its forward end. Straddling the rear end portions of the bars 18 are U-bolts 21 engaged through the side flanges of the side bars 10 rigidly securing the base frame near its rear end. Thus, the base frame may be readily attached.

Bolted or otherwise secured to the terminals 12 of the bars 10 are upstanding brackets 22 provided at their upper ends with bearings 23 and journaled through said bearings is a cross shaft 24. Pivotally supported by said shaft is a body 25 to the bottom of which is secured a pair of longitudinal side bars 26 as well as a pair of parallel center bars 27 reinforcing the body. Bolted or otherwise secured to the bars 26 near the rear end of the body are bearing brackets 28 accommodating the ends of the shaft 24 so that the body is thus mounted to tilt upwardly and rearwardly about the axis of said shaft. Fixed to the bottom of the body at its forward end is a saddle plate 29 disposed to cooperate with the rest 16 for supporting the body in horizontal position and formed on the plate at its ends are downturned lugs 30 to coact with the sides of the rest for limiting the forward end of the body against transverse movement.

Journaled through the bracket 17 and through the side bar 10 at the right of the base frame of the unit, as well as through the center bar 15 is a power shaft 31 on which is fixed a gear 32 and journaled through said side bar and through the center bar in the rear of the power shaft is a shaft 33 on which is fixed a large gear 34 meshing with the gear 32. Integral with the gear 34 is a small gear 35. Journaled through the bars 10 and 15 in the rear of the shaft 33 is a shaft 36 on which is fixed a large gear 37 meshing with the gear 35 and fixed to said shaft in spaced relation to the gear 37 is a small gear 38. Journaled through the side bar 10 at the left of the base frame and through the center bar 15 is a shaft 39 and fixed to said shaft is a combined lifting wheel and arm, the wheel being indicated at 40 and the arm at 41. The wheel and arm are integrally formed as a unitary structure and, as will be observed, the wheel is provided with gear teeth 42 throughout a portion of its periphery to mesh with the gears 38. Extending at opposite sides of the arm 41 are links 43 pivotally connected at their lower ends to the free end of the arm and at their upper ends to the forward ends of the center bars 27 of the body 25. Fixed upon the outer end of the power shaft 31 is a ratchet 44, the hub of which is recessed to form a squared socket 45 for a hand crank, as conventionally illustrated in dotted lines in Fig. 1, at 46, and pivoted upon the bracket 17 to coact with said ratchet is a pawl 47.

Normally, the arm 41 is disposed to project downwardly and slightly forwardly so that, as will now be seen in view of the foregoing, the crank 46 may be operated for turning the shaft 31 and rotating the wheel 40, when the arm will, as shown in Fig. 1, be swung up for lifting the forward end of the body 25 and tilting the body rearwardly to dump the contents thereof, the pawl 47 being engageable with the ratchet 44 for holding the body elevated. In this connection, attention is directed to the fact that during the initial upward movement of the body, when the load is heaviest, the upward travel imparted to the body for each turn of the crank will be relatively small while as the arm 41 approaches the horizontal and the load is lightened by the elevation of the forward end of the body, the upward travel of the body will progressively increase at each turn of the crank. Accordingly, little difficulty will be experienced in dumping while the dumping operation may be accomplished with reasonable quickness. Furthermore, attention is directed to the fact that, when the arm 41 is, as shown in Fig. 2, presented downwardly, the combined lifting wheel and arm will serve to lock the body in horizontal position, the body bearing at its forward end against the rest 16. Accidental upward tilting of the body such as might be brought about by jolting incident to the passage of the truck over rough roads or streets, will thus be prevented.

Having thus described the invention, I claim:

1. In a dumping unit for motor trucks, a base frame including side bars having parallel forward end portions and diverging rear end portions provided with parallel terminals, a cross bar extending between the forward ends of the side bars, a second cross bar extending between the side bars near the forward ends of the diverging portions thereof, a rest upstanding from the forward ends of said side bars, the several bars of the frame and said rest being integrally united to form a rigid unitary frame structure for attachment to a truck chassis, brackets mounted upon said terminals of the side bars, a body normally resting at its forward end upon said rest in horizontal position, brackets carried by the body, a cross shaft coacting with said first and second-mentioned brackets pivotally mounting the body, and means carried by the base frame for tilting the body.

2. The combination with a truck chassis including a frame having side bars, and a body wider than said frame, of a base frame including side bars having forward end portions extending longitudinally of said first-mentioned side bars within the lines thereof and angularly disposed rear end portions diverging across the side bars of the chassis frame toward the lines of the sides of the body, means supporting the base frame at its forward end upon the side bars of the chassis frame, the diverging rear end portions of the side bars of the base frame resting upon the side bars of the chassis frame and supporting the rear end portion of the base frame, hinge brackets carried by the diverging rear end portions of the latter side bars, and hinge brackets carried by the body adjacent the sides thereof and pivotally connected with said first-mentioned brackets for swingingly supporting the body upon the base frame.

3. The combination with a truck chassis including a frame having side bars, and a body wider than the chassis frame, of a base frame having forward portions extending longitudinally of the chassis frame within the lines thereof and angularly disposed rear portions diverging across the sides of the chassis frame toward the lines of the sides of the body, means for securing the base frame at its front end upon the sides of the chassis frame, the diverging rear portions of the base frame resting upon and supported by the sides of the chassis frame, means for mounting the body upon the rear end of the base frame for rocking movement, and means mounted on the base frame and connected with the forward portion of the body for tilting the body.

4. In a dumping unit for motor trucks, a base frame having opposite end portions extended laterally to engage the side bars of a truck chassis, and having the intermediate portion narrow to come between the said side bars, elements at opposite ends of the frame to form a front rest and rear bearing members, a body tiltably mounted upon the bearing members and normally in engagement with the said rest, a train of gearing mounted upon the intermediate narrow portion of the frame between the rest and bearing members and including a large gear wheel having an arm projected radially therefrom, and a link connection between the said body and radial arm.

5. A dumping unit for motor trucks comprising a base frame including parallel side bars and outwardly and rearwardly disposed members, connecting means between the side bars including a front cross bar projecting at opposite ends beyond the side bars to act jointly with the outwardly and rearwardly inclined members to support the frame upon the side bars of a truck chassis, a rest at the front end of the base frame, bearing members at the rear end of the base frame, a bracket projecting laterally from a side bar of the frame, and a train of gearing mounted upon the base frame and including a large gear wheel having an arm projected radially therefrom and a power shaft mounted in the said bracket and the adjacent side bar of the base frame.

In testimony whereof, I hereto set my hand.

HARRY POUNDER.